Figure 1:
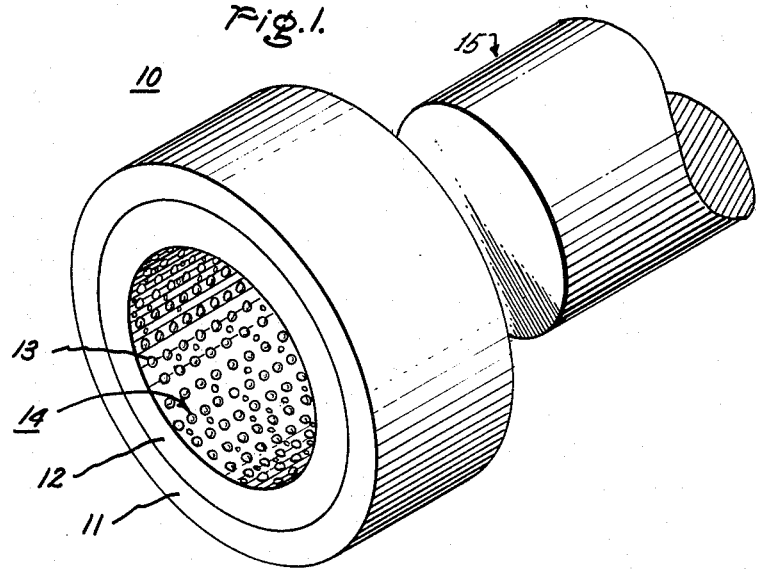

Inventor:
Donald G. Flom,
by James J. Lichiello
His Attorney.

United States Patent Office 3,161,449
Patented Dec. 15, 1964

3,161,449
COMBINED ROLLING AND SLIDING BEARING
Donald G. Flom, Berwyn, Pa., assignor to General Electric Company, a corporation of New York
Filed June 1, 1962, Ser. No. 199,490
14 Claims. (Cl. 308—239)

This invention relates to bearings and more particularly to a specific bearing configuration which utilizes both sliding and rolling types of bearing action.

Ordinarily, various bearing applications utilize either a rolling type of bearing such as the ball or roller type, etc., or a sliding type of bearing such as a sleeve or plain bearing. The sleeve or sliding type of bearing gives evidence of a much higher friction than the rolling element type of bearing but at the same time generally provides a greater load carrying capacity than the rolling type of bearing. There are many additional features of each type of bearing including economy, location of the bearing, environment, speed, etc., which influence the choice of a particular bearing configuration for a given application. One important feature in either type of bearing is lubrication whether of the dry lubricant type, for example utilizing such materials as graphite, molybdenum disulfide, nylon, Teflon resin, etc., or of the wet type utilizing oils, oter liquids, greases, etc. Wet type lubrication may be used directly, or by impregnation of these materials in a porous matrix. The many combinations and choices generally provide satisfactory compromises in a given application. A desirable bearing is one that combines good features of the rolling or sliding type of bearing together with the ability to provide sufficient lubrication, particularly lubrication of the dry type.

Accordingly, it is an object of this invention to provide an improved bearing.

It is another object of this invention to provide an improved rolling type of bearing.

It is yet another object of this invention to provide an improved sliding type of bearing.

It is another object of this invention to provide a combined rolling and sliding bearing.

It is yet another object of this invention to provide a combined rolling and sliding type of bearing utilizing a dry lubricant.

It is a further object of this invention to provide a composite bearing of a dry lubricant material with small hard metal spheres dispersed therein.

Briefly described, this invention includes a bearing matrix having a relatively low coefficient of sliding friction, for example in the form of a sleeve bearing, having a great number of very small hard metal balls dispersed therein, so that a shaft rotating in said sleeve bearing is supported at least in part by the balls which rotate in their individual sockets. More specifically, the matrix material of this bearing may be a dry lubricant material, for example nylon, Teflon resin, etc., with the hard metal balls randomly dispersed therein. Wear of the matrix continually exposes a layer of the hard small metal balls to the shaft surface which upon rotation rotates the small balls in their sockets to provide dry lubrication for the balls and between the balls and the shaft.

Figure 2:
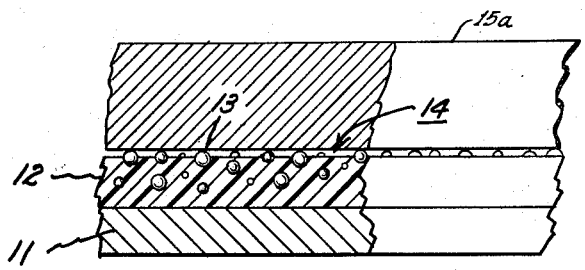

This invention will be better described when taken in connection with the following description and the drawing in which:

FIG. 1 is an illustration of one form of a combined rolling and sliding bearing in accordance with the teachings of this invention; and FIG. 2 is a strip or sheet form of the bearing of FIG. 1.

Referring now to FIG. 1, there is illustrated a bearing 10 in accordance with the teachings of this invention. Bearing 10 includes a backing strip or base member 11 incorporating a matrix material 12. Matrix 12 includes spherical elements 13 dispersed therein, a substantial number of which are disposed adjacent the bearing surface 14, at least some of this number being in contact with the surface of shaft 15 shown in the withdrawn position in FIG. 1. While the configuration of bearing 10 as disclosed is cylindrical, such a bearing may include various configurations of bearing structures whether arcuate or flat or combinations thereof, as well known in the bearing art. In addition, the backing strip may also be dispensed with, in some applications, where only an insert is needed. The material of matrix 12 is denoted as a plastic material, such as a polymer, and may include suitable dry lubricant materials, for example nylon, Teflon resin, epoxy resin, or combinations of these materials. Additionally, the material of matrix 12 may also include one or more such dry lubricant materials as $MoS_2$, graphite, etc., which are well known in the art. One suitable material for matrix 12 which has been utilized in this invention is an epoxy resin.

The spherical elements or balls 13 are generally of a material which is harder than the matrix material 12. Preferably, these balls are metallic including such metals as steel, aluminum, copper, tungsten, Nichrome, etc., and/or other metals and their alloys. One such suitable material which has been utilized in the practice of this invention is 316 stainless steel. Balls 13 should be geometrically spherical or approximately so for the same reasons as roundness is desired in the well known form of ball and roller type bearings. Ball sizes utilized in the practice of this invention range from 10 to 150 microns in diameter and may be utilized in similar sizes or mixed sizes.

The position of the spherical elements 13 in the matrix 12 is best described as at least a layer of the spherical elements 13 next adjacent the bearing or journal surface 14 some of which are in contact with the opposing element, such as shaft 15, transmitting its load to the bearing and preferably at least several additional layers below the surface 14 disposed through the thickness of matrix 12. For ease of manufacture and to increase the strength of the lubricant matrix 12, in one working example of this invention, the spheres 13 were randomly dispersed throughout matrix 12. Spheres 13 may also be oriented in the matrix 12 in geometric or irregular relationship.

In an exemplary practice of this invention, No. 316 stainless steel balls 13 were utilized in mixed sizes from 10 to 150 microns in diameter, and randomly dispersed throughout a matrix material member 12 of epoxy resin. The concentration of spheres in the epoxy resin 12 was about 7 percent of spherical elements by volume of epoxy resin. The spherical elements 13 were placed in the resin and mechanically mixed. Thereafter, the liquid mixture was permitted to cure in contact with a metal washer of 1⅝ inches O.D. and ⅟₁₆ inch thick which then served as a backing plate or shell 11. A similar specimen of epoxy resin, but containing no spheres, was cured on another similar washer and used as a control specimen. Prior to testing, the resin surface was faced off by machining. Both the control element and the bearing were tested in a bearing tester by having the washers in contact with an annular ring of 1⅛ inches O.D. and ⅞ inch I.D. A load of 10 kilograms and a rotational speed of 0.0461 inch per second were utilized over a period of about one hour. The average coefficient of friction during the run for the resin control member only was about 0.17 and above whereas the coefficient of friction for the composite bearing was about 0.15 and lower. A profile measurement indicated that the wear track on the control specimen was about 115 microinches in depth while there was no detectable wear on the resin sphere specimen. Two primary advantages thus obtained are, a reduced coefficient friction and a lower wear of bearing members. Among other advantages are the features (1) that the spheres provide a strengthening effect in the matrix to reduce flow or extrusion and facilitate shock loadings, (2) that these spheres provide additional heat dissipation where a matrix may be of a poor heat conducting medium, and (3) where the lubricant employed is one which performs better under high unit pressure, the spheres provide these high unit pressures especially adjacent the opposed surface.

Bearings prepared according to the teachings of this invention provide a combined rolling and sliding action. The rolling action is obtained by the rolling of the small metal spheres in their individual sockets. The sliding action is obtained by the lubricant material between the spheres engaging the opposed surface. The rolling action of this combination permits the spheres to roll in the lubricant and apply lubricant to the opposed surface, a shaft for example. While considerable variance in sphere sizes may be utilized, a preferred size range is between about 10 to 150 microns whether mixed or of equal sizes. Larger size spheres may also be employed depending on the type of bearing, the surface area, and the thickness of the matrix material 12, however, the volume of the spheres should generally be less than about 10% of the matrix volume. With respect to thickness of the layer of matrix material, the preferred arrangement is one in which a plurality of spheres are arranged in somewhat superimposed relationship in a dry lubricant matrix layer with the thickness of the layer of the matrix material being such that any single sphere does not directly support and transmit the load between the bearing surface and the opposing member, for example a journal and a shaft.

The spherical elements 13 are preferably initially loose in their respective cavities or sockets or will tend to become loose in bearing operation for free rolling action. These elements 13 may therefore be coated before dispersal in the matrix by a soft material or a material which will dissolve under preparation conditions. A wet lubricant such as oil may be utilized. In this respect, such spherical elements 13 utilizing a wet lubricant may be incorporated in a metallic or ceramic matrix such as is well known in the impregnated bearing art relative to porous bronze bearings, etc. A bearing in accordance with the teachings of this invention may have various configurations such as arcuate members generally, cylinders, strips, discs, etc. A flat form of the bearing of this invention is illustrated in FIG. 2. In FIG. 2, the backing member 11 may be for example an easily flexible elongated strip of metal. The matrix 12 with the spheres 13 incorporated is formed or cast on strip 11. Thereafter, the assembly may be cut into strips of various lengths, short lengths to be used as short flat bearing segments such as is shown in contact with flat opposing element 15a of the bearing construction, or longer lengths to be used in arcuate, cylindrical, etc., bearing members.

Where the matrix material 12 is an electrically conductive material, such as a metal, an electrically conductive bearing is provided. Such bearings, particularly in flat or strip form, are useful as sliding electrical conductors or surfaces over which a conductor slides. Alternatively, the ratio of spheres 13 to material 12 may be greatly increased to provide electrically conductive characteristics, or to increase electrically conductive characteristic of a matrix 12 having poor electrical conducting properties.

While a specific method and apparatus in accordance with this invention is described and shown, it is not intended that the invention be limited to the particular description nor to the particular configurations illustrated, and it is intended by the appended claims to cover all modifications within the spirit and scope of this invention.

What I claim as new and desire to secure by Letters Patent of the United States is:

1. A bearing material comprising, a relatively uniformly thick layer of matrix material having a relatively low coefficient of sliding friction and a plurality of substantially spherical metal elements dispersed in said matrix material with a substantial number of said spherical elements being located at the bearing surface of said matrix material, each of said spherical elements having a diameter substantially smaller than the thickness of said matrix material, having a greater hardness than said matrix material and being rotatable relative thereto.

2. The bearing material as recited in claim 1 wherein the matrix material is a dry lubricant.

3. The bearing material as recited in claim 1 wherein the matrix material is metallic.

4. In a bearing construction, two surfaces in juxtaposition, one of said surfaces being movable relative to the other surface in bearing relationship, a relatively uniformly thick layer of dry lubricant material disposed therebetween, and a plurality of small spheres dispersed in said lubricant material, each of said spheres having a greater hardness than said lubricating material and having a diameter substantially smaller than the thickness of said layer of lubricating material whereby no single sphere can directly transmit the bearing load between the said surfaces.

5. In a bearing construction, two surfaces in juxtaposition, one of said surfaces being movable relative to the other surface in bearing relationship, a relatively uniformly thick layer of matrix material having a relatively low coefficient of sliding friction disposed therebetween, and a plurality of small substantially spherical elements dispersed in said matrix material, each of said spherical elements having a greater hardness than said matrix material, being rotatable relative thereto and having a diameter substantially smaller than the thickness of said layer of matrix material whereby no single spherical element can directly transmit the bearing load between said surfaces.

6. The invention as recited in claim 5 wherein the matrix material is metallic and the spherical elements are metallic.

7. The bearing construction as recited in claim 5 wherein the spherical elements are of a single size less than about 150 microns diameter.

8. The bearing construction as recited in claim 5 wherein the spherical elements are randomly oriented in separate layers.

9. The bearing construction as recited in claim 5 wherein the spherical elements are in random sizes.

10. A bearing comprising a backing member, a layer of dry lubricant material of relatively uniform thickness on said backing member, and a plurality of small metal spheres of less than about 150 microns diameter dispersed throughout said layer of material in a plurality of vertical and horizontal planes, said layer of material being of substantially greater thickness than the diameter of the largest sphere.

11. The bearing as recited in claim 10 wherein said spheres are of random diameter.

12. The bearing as recited in claim 10 wherein said spheres are of similar diameter.

13. The bearing construction as recited in claim 5 wherein the spherical elements are less than about 10 percent by volume of said dry lubricant.

14. The bearing construction as recited in claim 4 wherein the small spheres are oriented in at least two separate layers.

(References on following page)

References Cited by the Examiner

UNITED STATES PATENTS

| | | | |
|---|---|---|---|
| 722,900 | 3/03 | Reilly. | |
| 1,229,003 | 6/17 | Winter | 308—6 |
| 2,294,930 | 9/42 | Palmquist. | |
| 2,569,531 | 10/51 | Kunzog | 308—241 X |
| 2,796,659 | 6/57 | Buske | 29—149.5 |
| 2,852,322 | 9/58 | Fisher | 308—237 |
| 2,905,511 | 9/59 | Cerness | 308—237 |
| 3,001,837 | 9/61 | Lamson et al. | 308—241 X |
| 3,004,323 | 10/61 | Pitner | 29—149.5 |

ROBERT C. RIORDON, *Primary Examiner.*

MILTON KAUFMAN, *Examiner.*